Figure 1:
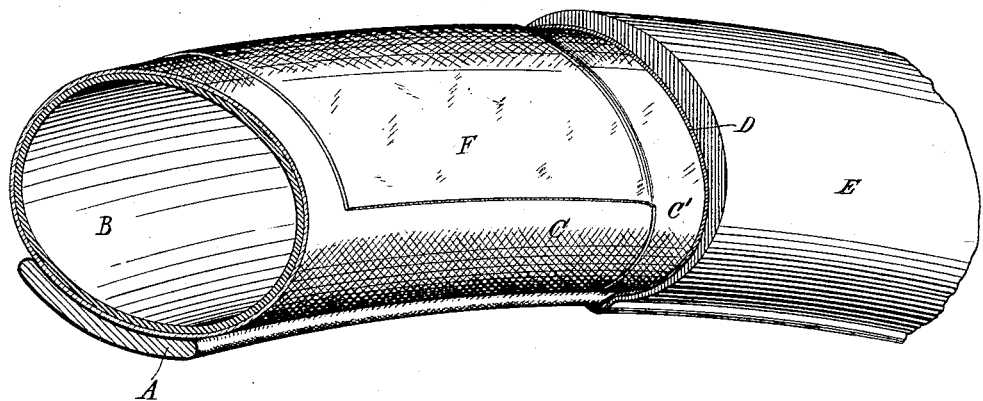

(No Model.)

F. SINCLAIR.
PNEUMATIC TIRE.

No. 480,349. Patented Aug. 9, 1892.

Witnesses:
Raphael Netter
M. G. Tracy

Inventor
Finlay Sinclair
by
Duncan & Page,
Attorneys.

UNITED STATES PATENT OFFICE.

FINLAY SINCLAIR, OF COVENTRY, ENGLAND, ASSIGNOR TO THE PNEUMATIC TYRE AND BOOTH'S CYCLE AGENCY, LIMITED, OF DUBLIN, IRELAND.

PNEUMATIC TIRE.

SPECIFICATION forming part of Letters Patent No. 480,349, dated August 9, 1892.

Application filed February 15, 1892. Serial No. 421,491. (No model.)

*To all whom it may concern:*

Be it known that I, FINLAY SINCLAIR, a subject of the Queen of Great Britain, residing at Coventry, in the county of Warwick, England, have invented a new and useful Improvement in Pneumatic Tires, of which the following is a specification, reference being had to the drawings accompanying and forming a part of the same.

This invention is an improvement in pneumatic or inflatable tires for bicycles and other wheels, more especially applicable to the particular form of tire described and shown in reissued Letters Patent No. 11,153, dated March 24, 1891.

In the construction or manufacture of the particular tire referred to it is now usual to surround the grooved metallic felly of the wheel with a layer of canvas secured by cement. Around this is laid the tire proper, which consists of an expansible rubber tube contained in a tubular non-expansible confining-jacket, and the whole is then secured to the wheel by the flaps or edges of a canvas strip attached to or forming part of the said non-expansible jacket, and which are drawn around the edges of the felly and secured to the inner face of the same. A rubber covering is secured over or around the non-expansible jacket. In this as in other forms of tire which involve an inner rubber or expansible tube and a surrounding or confining non-expansible jacket, and particularly where the latter, whether formed of one or more pieces, is made up before application to the felly and the rubber tube drawn into it, considerable difficulty is experienced in gaining access to the interior rubber tube in case of puncture of the latter or generally for purpose of repair or renewal, and hitherto where for the non-expansible jacket a seamless woven tube has been employed this necessitated the cutting of the woven tube, by which the subsequent strength and durability of the tire was impaired.

According to the present improvement the confining-jacket is primarily of a length greater than the circumference of the felly, and a portion of its end is cut away, leaving a flap which may be cemented to the opposite end of said jacket and of a width sufficient to extend over the outer or tread portion of the tire. This flap, while it serves to firmly unite the ends of the jacket to form an endless confining-tube and prevents the strain to which the tire is subjected in use from separating the ends of the tube, particularly along the outer or tread portion where the strain is greatest, may at any time be stripped back for the purpose of opening the said tube and permitting access to the rubber tube, within which may be cut and replaced by a new tube or shifted around to expose any portion to the opening.

The improvement as applied to a specially-constructed tire is illustrated in the accompanying drawings.

Figure 2:
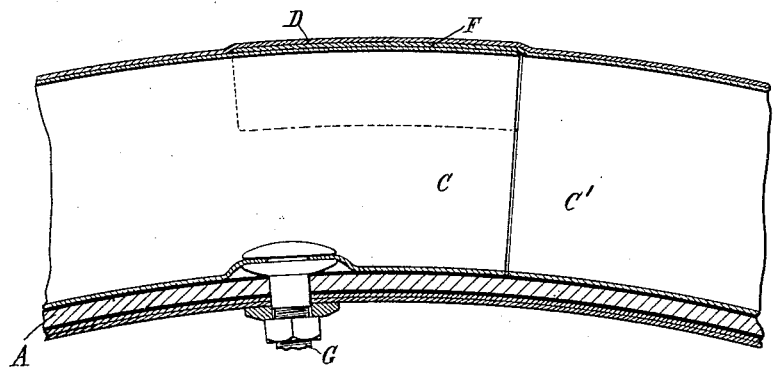

Figure 1 is a perspective view of a section of tire and felly, parts of the same being removed to exhibit the construction. Fig. 2 is a longitudinal section of the same.

A is the canvas-covered felly.

B is the inner inflatable tube of india-rubber.

C C' are the two ends of a non-expansible confining tube or jacket of canvas or the like.

D is a strip of canvas cemented or otherwise secured over the tube C C' and having its edges carried around and cemented to the inner or under face of the felly A.

E is the rubber covering cemented to the strip D.

F is the flap or tongue extending from one of the ends, as C', of the confining-tube, and which, when the two ends of said tube are brought together, is drawn over and cemented to the outside of the end C. This tongue may extend over a greater or less portion of the circumference of the tube, provided it serve adequately to unite the two ends and form a practically endless tube or confining-cover.

It is usual to place the inflating-valve G near the point at which the two ends C C' come together, so that when the tube is opened the valve, in case its construction and mode of attachment permits of it, may be more readily detached to allow the rubber tube to be shifted around the wheel.

The tongue may be readily secured to the end C after being detached therefrom, and by this means access is readily afforded to the interior of the tire.

In this particular tire it is only necessary when reopening to strip back the rubber covering and strip D to obtain access to the tongue or flap F.

I claim—

1. In a pneumatic tire of the kind described, the combination, with an inner expansible or inflatable tube, of a tubular non-expansible confining-jacket of canvas, the ends of which are secured together by a flap or tongue from one overlapping and secured to the other, as set forth.

2. The combination, with a felly A, of a rubber inflatable tube B, and a tubular canvas jacket the contiguous ends of which are united by a flap or tongue F, extending from the outer or tread portion of one and overlying and cemented to the other, as described.

FINLAY SINCLAIR.

Witnesses:
W. R. SHELDEN,
ERNEST HARKER.